United States Patent
Ghosh

(10) Patent No.: US 10,231,182 B2
(45) Date of Patent: Mar. 12, 2019

(54) TECHNIQUES FOR IMPLICIT INDICATION OF TRIGGER FRAME START TIMES

(71) Applicant: INTEL IP CORPORATION, Santa Clara, CA (US)

(72) Inventor: Chittabrata Ghosh, Fremont, CA (US)

(73) Assignee: INTEL IP CORPORATION, Santa Clara, CA (US)

(*) Notice: Subject to any disclaimer, the term of this patent is extended or adjusted under 35 U.S.C. 154(b) by 145 days.

(21) Appl. No.: 14/752,721

(22) Filed: Jun. 26, 2015

(65) Prior Publication Data

US 2016/0269993 A1  Sep. 15, 2016

Related U.S. Application Data

(60) Provisional application No. 62/132,339, filed on Mar. 12, 2015.

(51) Int. Cl.
| | | |
|---|---|---|
| *H04L 12/50* | (2006.01) | |
| *H04W 52/02* | (2009.01) | |
| *H04W 74/00* | (2009.01) | |

(52) U.S. Cl.
CPC ... *H04W 52/0229* (2013.01); *H04W 52/0216* (2013.01); *H04W 74/006* (2013.01); *Y02D 70/00* (2018.01); *Y02D 70/1224* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/166* (2018.01); *Y02D 70/168* (2018.01); *Y02D 70/21* (2018.01)

(58) Field of Classification Search
CPC .................................................. H04W 52/005
See application file for complete search history.

(56) References Cited

U.S. PATENT DOCUMENTS

| | | | | |
|---|---|---|---|---|
| 2016/0219522 A1* | 7/2016 | Asterjadhi | ........ | H04W 52/0274 |
| 2016/0227579 A1* | 8/2016 | Stacey | .............. | H04W 74/0833 |

* cited by examiner

*Primary Examiner* — Dang Ton

(57) ABSTRACT

Techniques for implicit indication of trigger frame start times are described. In various embodiments, an AP may be configured to transmit a trigger frame at the beginning of each target wake time (TWT) interval. In some embodiments, each STA that uses a given TWT interval may be configured to treat a TWT Start Time received from the AP not only as a start time for that TWT interval but also as a start time for the trigger frame to be received from the AP. In various embodiments, each STA in a TWT Group may wait to receive the trigger frame from the AP upon awakening during its TWT interval. The embodiments are not limited in this context.

19 Claims, 10 Drawing Sheets

TECHNIQUES FOR IMPLICIT INDICATION OF TRIGGER FRAME START TIMES

RELATED CASE

This application claims priority to U.S. Provisional Patent Application No. 62/132,339, filed Mar. 12, 2015, the entirety of which is hereby incorporated by reference.

TECHNICAL FIELD

Embodiments described herein generally relate to wireless communications between devices in wireless networks.

BACKGROUND

In an advanced wireless fidelity (Wi-Fi) network such as a high-efficiency wireless local area network (WLAN), access to the wireless medium may be allocated using orthogonal frequency-division multiple access (OFDMA). The use of OFDMA may provide the flexibility of allocating medium access at a sub-channel level of granularity. A trigger frame (TF) may be defined for use by an access point (AP) in such a network to notify stations (STAs) of sub-channels that have been allocated to them during particular intervals. A TF that allows random access (TF-R) may be defined for use by an AP in such a network to notify STAs of intervals during which they may contend for use of sub-channels. An AP may transmit multiple TFs within a given beacon interval, and/or may schedule one or more TF-Rs during that beacon interval. According to some techniques, the AP may include a TF-R Start Time for a first scheduled TF-R in the beacon frame for that beacon interval.

In some wireless networks in which an AP uses TF and TF-R frames to provide STAs with medium access information, the AP may also define one or more Target Wake Time (TWT) Groups. After having defined a given TWT Group, the AP may include a TWT Start Time for that TWT Group in a beacon frame for a beacon interval. The TWT Start Time may identify a subsequent point in time during the beacon interval at which a TWT interval for the TWT Group is to begin. Following receipt of the beacon frame, the STAs in the TWT Group may enter a sleep state, in which they may remain until returning to an awake state during the TWT interval beginning at the TWT Start Time.

DETAILED DESCRIPTION

Figure 1:
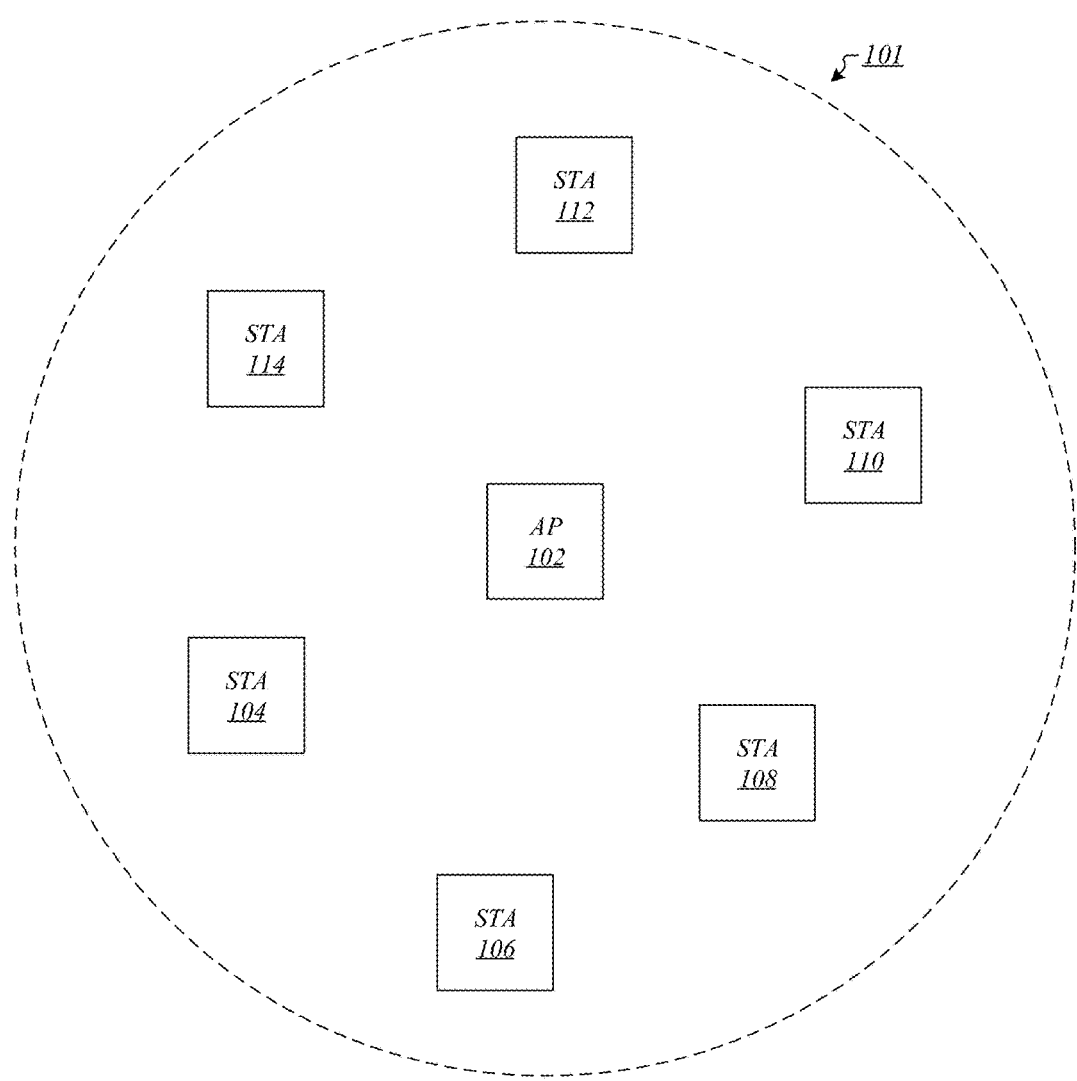
FIG. 1 illustrates an embodiment of a first operating environment.

Various embodiments may be generally directed to techniques for implicit indication of trigger frame start times. In some embodiments, an AP may be configured to transmit a trigger frame at the beginning of each target wake time (TWT) interval. In various embodiments, each STA that uses a given TWT interval may be configured to treat a TWT Start Time received from the AP not only as a start time for that TWT interval but also as a start time for the trigger frame to be received from the AP. In some embodiments, each STA in a TWT Group may wait to receive the trigger frame from the AP upon awakening during its TWT interval. The embodiments are not limited in this context.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Embodiments herein are generally directed to wireless communications systems. Various embodiments are particularly directed to wireless communications performed according to one or more wireless communications standards. Some embodiments may involve wireless communications performed according to High-Efficiency Wi-Fi standards developed by the IEEE 802.11 High Efficiency WLAN (HEW) Study Group. Various embodiments may involve wireless communications performed in accordance with an Institute of Electrical and Electronics Engineers (IEEE) 802.11ax standard. Some embodiments may involve wireless communications performed in accordance with the DensiFi Specification Framework Document (SFD). The embodiments are not limited in this context.

Some embodiments may additionally or alternatively involve wireless communications according to one or more other wireless communication standards. Examples of other wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above.

Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

FIG. 1 illustrates an example of an operating environment 100 such as may be representative of some embodiments. In operating environment 100, access to the wireless medium in a wireless network 101 is managed by an AP 102. In various embodiments, wireless network 101 may comprise a wireless network operating according to one or more standards developed by the IEEE High Efficiency WLAN (HEW) Study Group. In some embodiments, wireless network 101 may operate in accordance with an IEEE 802.11ax standard. In various embodiments, AP 102 may manage medium access on the part of one or more STAs within wireless network 101. In the example of FIG. 1, wireless network 101 comprises STAs 104, 106, 108, 110, 112, and 114. The embodiments are not limited to this example.

In some embodiments, access to the wireless medium in wireless network 101 may be managed using OFDMA, enabling AP 102 to allocate medium access at a sub-channel level of granularity. In various embodiments, AP 102 may be configured with the ability to use a TF to schedule medium access for a particular STA on one or more sub-channels during a particular interval. In some embodiments, AP 102 may also be configured with the ability to use a TF-R to instruct STAs that wish to transmit to contend for sub-channels over which to perform their transmissions. In various embodiments, AP 102 may further be configured with the ability to define one or more TWT Groups. In some embodiments, after having defined a given TWT Group, AP 102 may include a TWT Start Time for that TWT Group in a beacon frame for a beacon interval. In various embodiments, following receipt of the beacon frame, the STAs in the TWT Group may enter a sleep state, in which they may remain until returning to an awake state during a TWT interval beginning at the TWT Start Time. The embodiments are not limited in this context.

Figure 2:
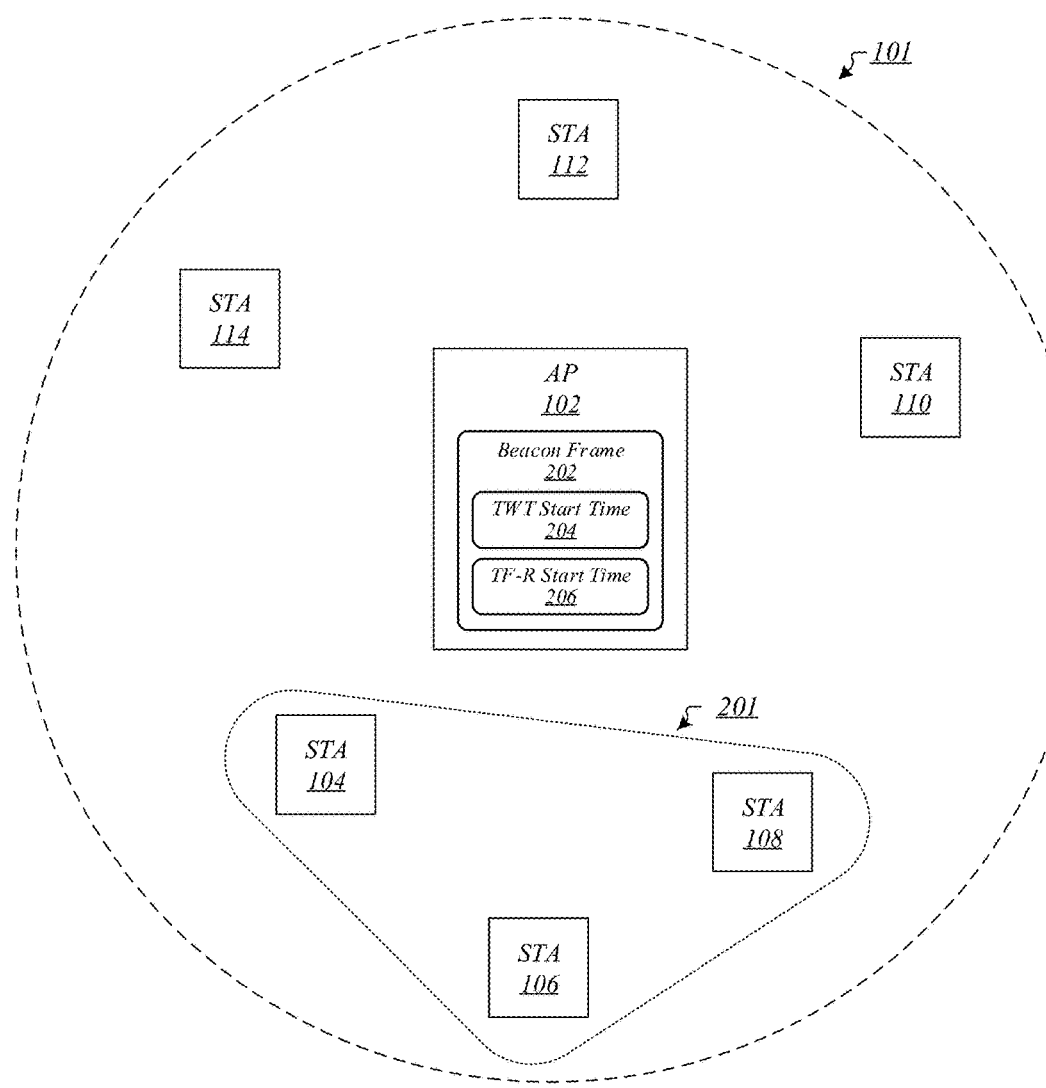
FIG. 2 illustrates an embodiment of a second operating environment.

FIG. 2 illustrates an example of an operating environment 200 such as may be representative of some embodiments. In operating environment 200, AP 102 defines a TWT Group 201 that comprises STAs 104, 106, and 108. In order to notify the STAs in TWT Group 201 of a time at which their TWT interval will begin during a given beacon interval, AP 102 includes a TWT Start Time 204 in a beacon frame 202 for that beacon interval. According to conventional techniques, if AP 102 wants to use a TF or TF-R to control use of OFDMA resources by the STAs in a TWT group during a TWT interval, AP 102 may need to include a start time for the TF or TF-R in the same beacon frame that comprises the start time for the TWT interval. For example, according to conventional techniques, if AP 102 wants to send a TF-R to the STAs 104, 106, and 108 in TWT Group 201 during the TWT interval beginning at a time identified by TWT Start Time 204, AP 102 may need to include within beacon frame 202 a TF-R Start Time 206 that identifies the start time for that TF-R. The need to include such start times within beacon frames may increase the overall signaling overhead associated with management of medium access within wireless network 101.

Disclosed herein are techniques for implicit indication of trigger frame start times that may enable a reduction in the signaling overhead associated with the use of TFs and/or TF-Rs to control use of OFDMA resources by STAs in TWT groups in some embodiments. According to various embodiments, the AP 102 for wireless network 101 may be configured to transmit a TF or a TF-R at the beginning of each TWT interval. In some embodiments, each STA that uses TWTs may be configured to treat a TWT Start Time received from AP 102 not only as a start time for that STA's TWT interval but also as a start time for a TF or TF-R to be received from AP 102. In such embodiments, each STA in a TWT Group may wait to receive the TF or TF-R from AP 102 upon awakening during its TWT interval. Thus, for example, upon awakening during a TWT interval that begins at a time specified by TWT Start Time 204, the STAs 104, 106, and 108 in TWT Group 201 may wait to receive a TF or TF-R from AP 102, rather than immediately initiating contention for transmission resources. In some embodiments, configuring AP 102 and the various STAs in this manner may eliminate the need for the inclusion of TF-R Start Time 206 in beacon frame 202. The embodiments are not limited in this context.

Figure 3:
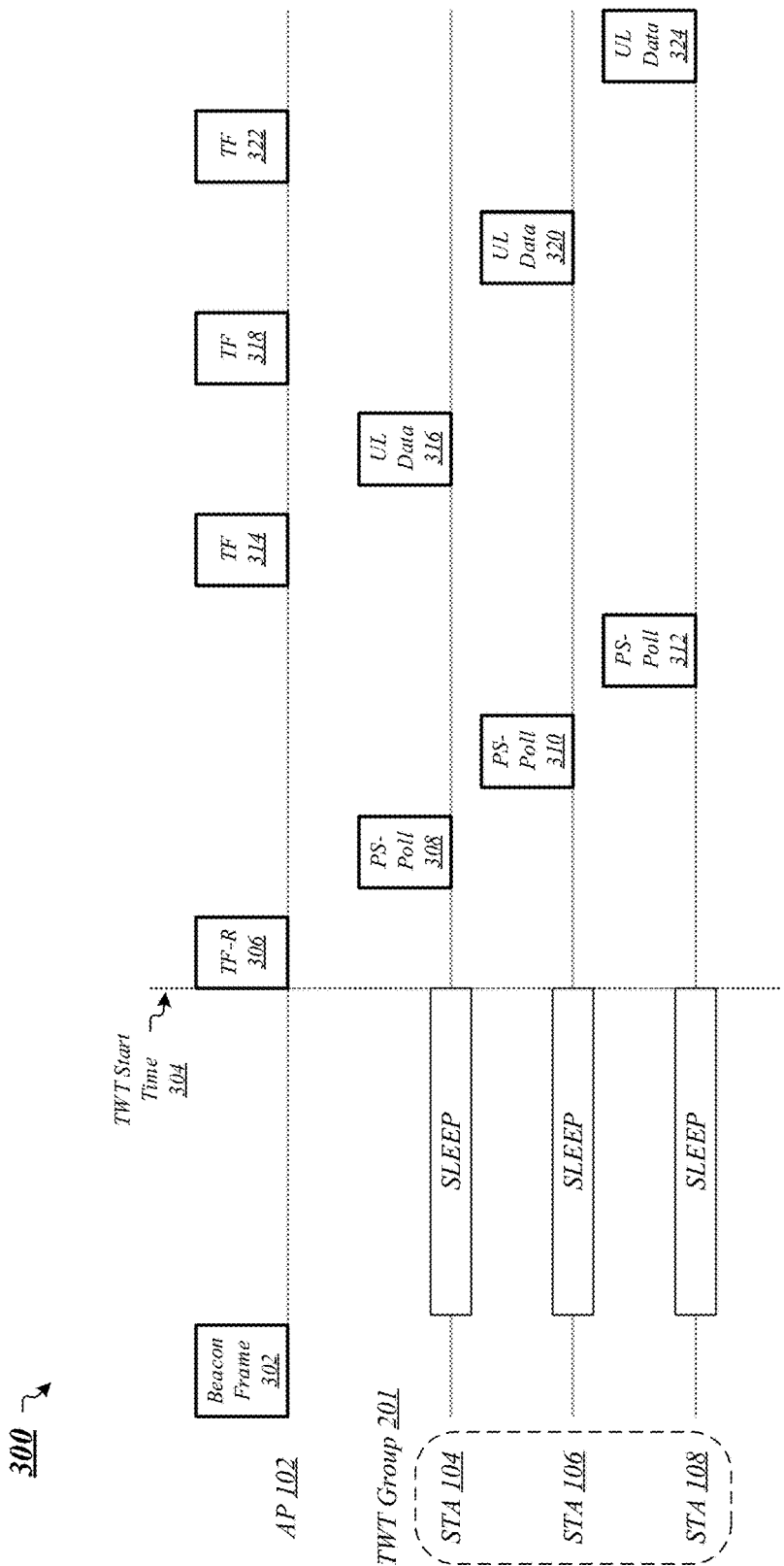
FIG. 3 illustrates an embodiment of a first communications flow.

FIG. 3 illustrates an example of a communications flow 300 that may be representative of various embodiments in which an AP sends a TF-R to a TWT Group at the start of a TWT interval. In some embodiments, it may be desirable for an AP to send a TF-R to a TWT Group at the start of a TWT interval when the AP does not have information regarding which STAs are awake and/or does not have information regarding which STAs have UL data to transmit to the AP. As shown in FIG. 3, communications flow 300 involves communications between AP 102 and the STAs 104, 106, and 108 comprised in TWT Group 201. Communications flow 300 begins when AP 102 transmits a beacon frame 302 that comprises a TWT Start Time 304 for a TWT interval designated for TWT Group 201. Following receipt of beacon frame 302, the STAs in TWT Group 201 enter a sleep state, in which they remain until TWT Start Time 304.

At TWT Start Time 304, the STAs in TWT Group 201 enter an awake state. However, rather than initiating contention for transmission resources, they wait to receive either a TF or a TF-R from AP 102. In communications flow 300, the STAs in TWT Group 201 receive a TF-R 306 from AP 102. In response to receipt of TF-R 306, the STAs in TWT Group 201 transmit UL short frames to AP 102 in order to notify AP 102 that they have UL data for transmission. In the example of communications flow 300, STAs 104, 106, and 108 transmit respective PS-Poll frames 308, 310, and 312 in order to notify AP 102 that they have UL data for transmission. In response to the received PS-Poll frames 308, 310, and 312, AP 102 uses TFs to allocate resources for use by STAs 104, 106, and 108 to transmit their respective UL data.

AP 102 transmits a TF 314 to allocate resources to STA 104, and STA 104 then uses those resources to transmit UL data 316. AP 102 transmits a TF 318 to allocate resources to STA 106, and STA 106 then uses those resources to transmit UL data 320. AP 102 transmits a TF 322 to allocate resources to STA 108, and STA 108 then uses those resources to transmit UL data 324. The embodiments are not limited to this example.

In various embodiments, STAs 104, 106, and 108 may contend for transmission resources following reception of TF-R 306. For example, in some embodiments, after transmitting respective PS-Poll frames 308, 310, and 312, STAs 104, 106, and 108 may each attempt to initiate UL data transmission over a randomly selected sub-channel. In various such embodiments, some or all of UL data 316, 320, and/or 324 may be transmitted to AP 102 over such randomly selected sub-channels, rather than over sub-channels specified by TFs 314, 318, and/or 322. The embodiments are not limited in this context.

Figure 4:
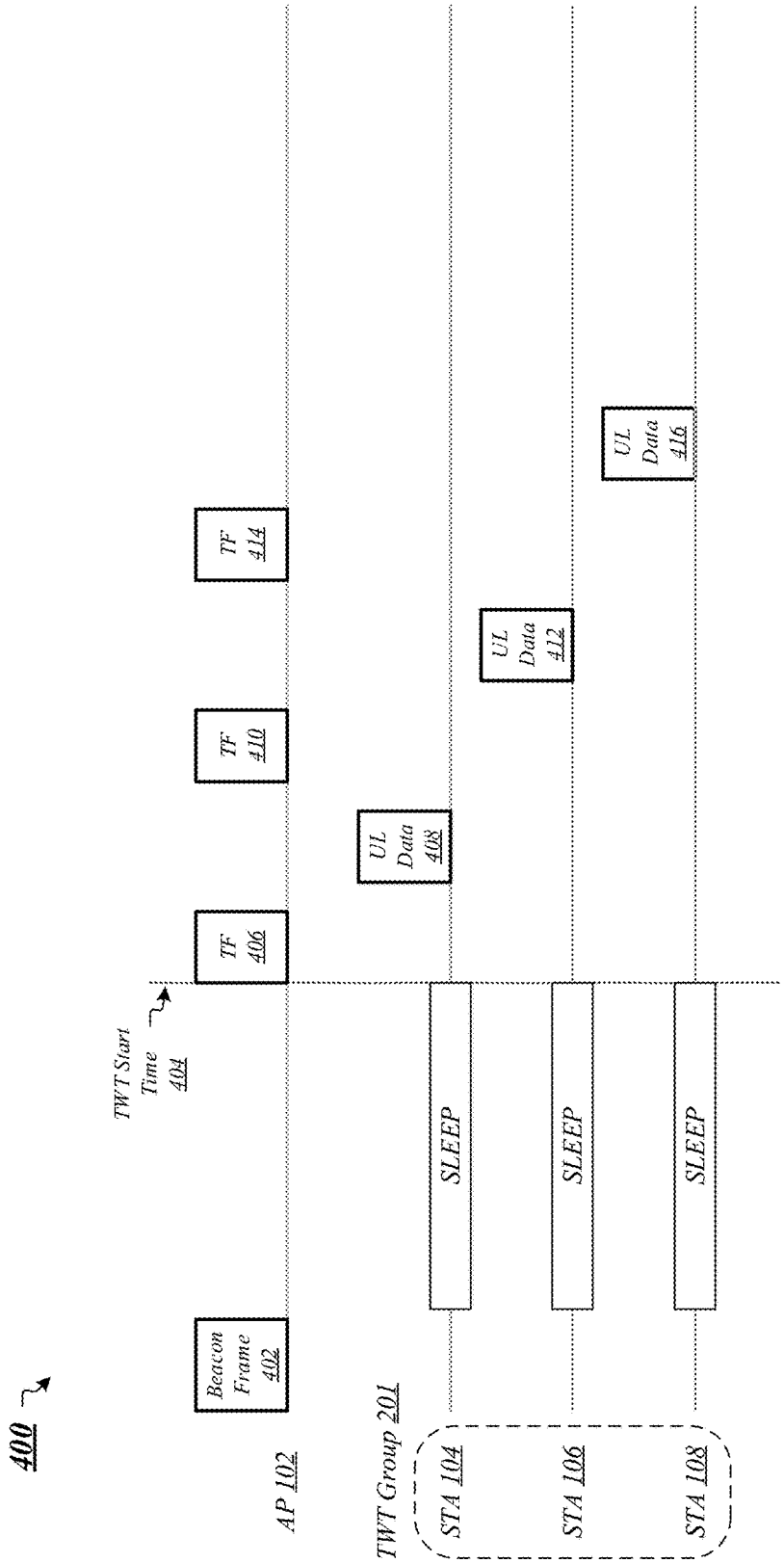
FIG. 4 illustrates an embodiment of a second communications flow.

FIG. 4 illustrates an example of a communications flow 400 that may be representative of some embodiments in which an AP sends a TF to a TWT Group at the start of a TWT interval. In various embodiments, it may be desirable for an AP to send a TF to a TWT Group at the start of a TWT interval when the AP has DL data to transmit to one or more of the STAs in the TWT Group. As shown in FIG. 4, communications flow 400 involves communications between AP 102 and the STAs 104, 106, and 108 comprised in TWT Group 201. Communications flow 400 begins when AP 102 transmits a beacon frame 402 that comprises a TWT Start Time 404 for a TWT interval designated for TWT Group 201. Following receipt of beacon frame 402, the STAs in TWT Group 201 enter a sleep state, in which they remain until TWT Start Time 404.

At TWT Start Time 404, the STAs in TWT Group 201 enter an awake state. However, rather than initiating contention for transmission resources, they wait to receive either a TF or a TF-R from AP 102. In communications flow 400, the STAs in TWT Group 201 receive a TF 406 from AP 102. The TF 406 identifies resources for use by STA 104 to transmit UL data, and an interval during which STA 104 may use those resources. In response to receipt of TF 406, STA 104 transmits UL data 408 using resources identified in TF 406. AP 102 also sends a TF 410 that identifies resources for use by STA 106 to transmit UL data, and an interval during which STA 106 may use those resources. In response to receipt of TF 410, STA 106 transmits UL data 412 using resources identified in TF 410. AP 102 also sends a TF 414 that identifies resources for use by STA 108 to transmit UL data, and an interval during which STA 108 may use those resources. In response to receipt of TF 414, STA 108 transmits UL data 416 using resources identified in TF 414. In some embodiments, AP 102 may use a given TF to assign resources for use by multiple respective STAs during a same interval. In an example, TF 406 may assign one sub-channel to STA 104 for use in transmission of UL data 408 during a particular interval, and may assign another sub-channel to STA 106 for use in transmission of UL data 412 during that same interval. The embodiments are not limited to this example.

Figure 5:
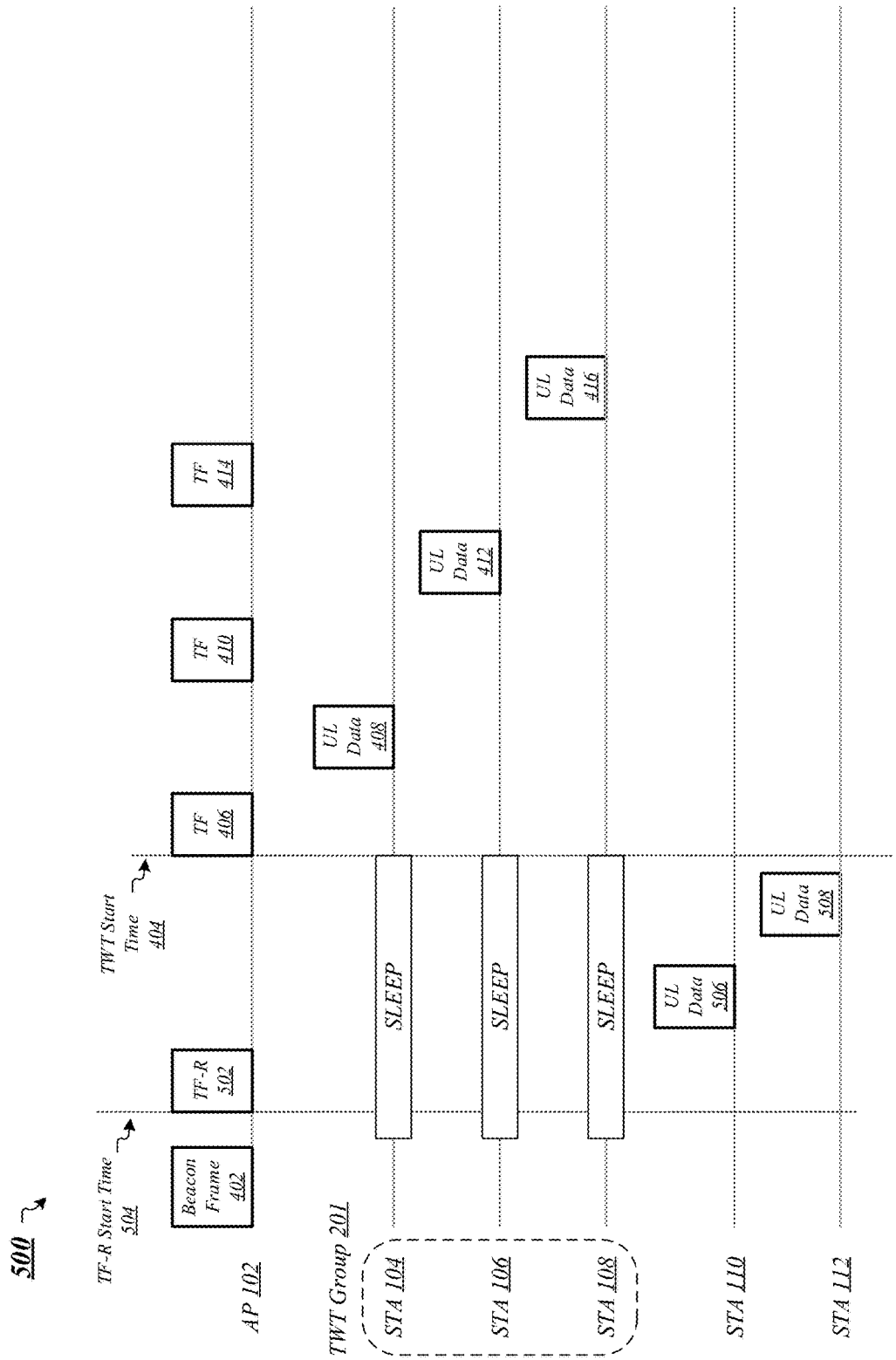
FIG. 5 illustrates an embodiment of a third communications flow.

FIG. 5 illustrates an example of a communications flow 500 that may be representative of various embodiments in which an AP schedules a TF-R for one or more STAs outside of a TWT interval. In communications flow 500, AP 102 indicates the same TWT Start Time 404 for the TWT interval associated with TWT Group 201, and exchanges the same communications with the STAs 104, 106, and 108 of TWT Group 201 during that TWT interval. However, AP 102 also schedules a TF-R 502 for transmission to STA 110 and 112 at a TF-R Start Time 504. In order to notify STAs 110 and 112 of TF-R Start Time 504, AP 102 may include TF-R Start Time 504 within beacon frame 402. STAs 110 and 112 may then receive TF-R 502 at TF-R Start Time 504, and may transmit respective UL data 506 and 508 to AP 102 using random channel access. The embodiments are not limited to this example.

It is worthy of note that in various embodiments, certain restrictions may be placed on TF and/or TF-R scheduling with respect to STAs that use TWTs. For example, in some embodiments, the AP may not be permitted to schedule a TF outside of the TWT intervals used by STAs that use TWTs for UL or DL data transfer. In various such embodiments, the AP may still be permitted to transmit a TF-R or TF outside such TWT intervals for STAs that do not use TWTs. In some embodiments, an AP may include a cascade indication bit in the TF-Rs that it transmits. In various embodiments, the AP may set the cascade indication bit to 1 in order to indicate that the current TF-R is followed by another TF-R, and may set the cascade indication bit to 0 in order to indicate that the current TF-R is not followed by another TF-R. In some embodiment, the AP may be configured to set the cascade indication bit to 0 at the end of a TWT for STAs that have their wake times within that TWT. In various embodiments, this restriction may prevent channel access outside a TWT interval by STAs with wake times within the TWT interval. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
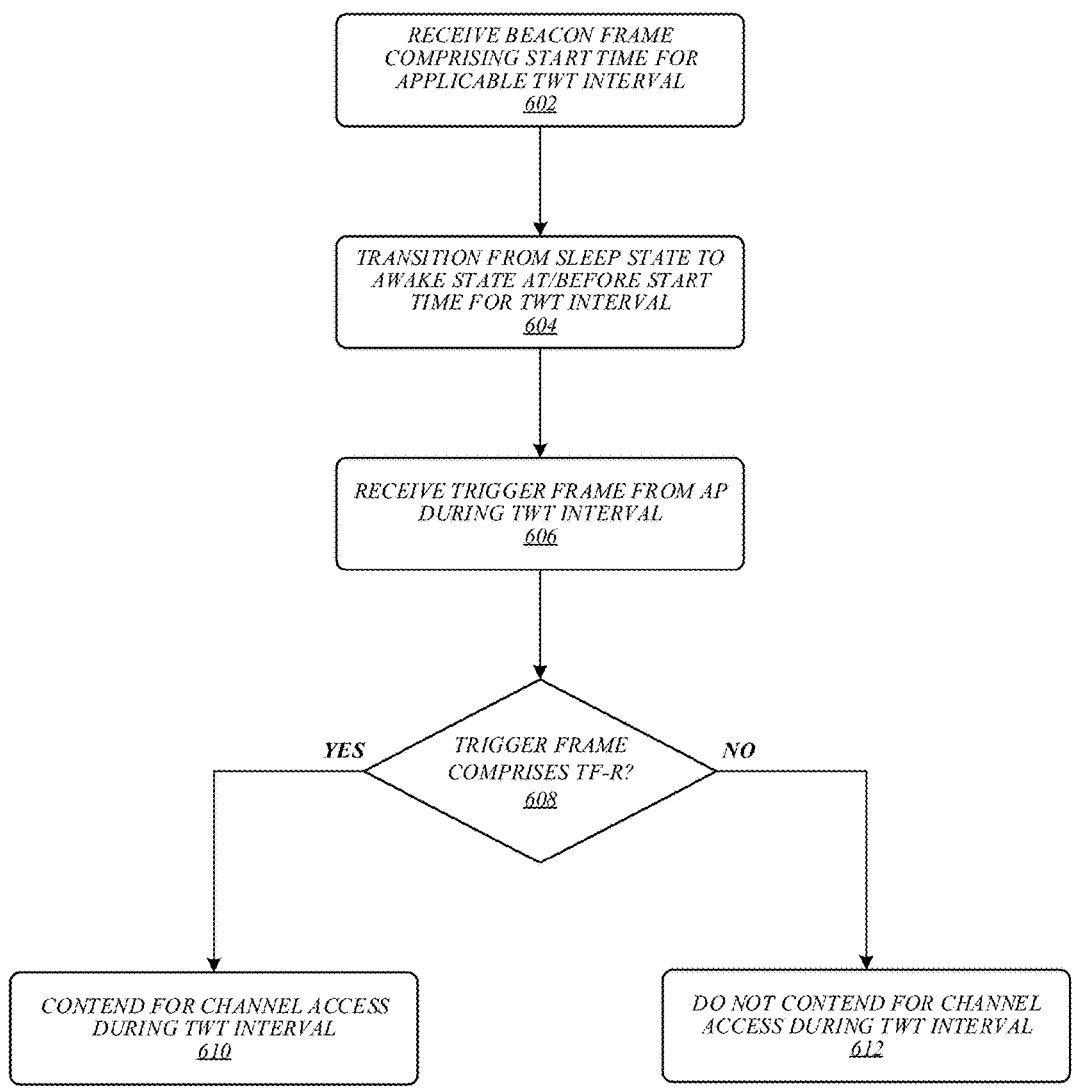
FIG. 6 illustrates an embodiment of a first logic flow.

FIG. 6 illustrates an embodiment of a logic flow 600, which may be representative of the implementation of techniques for implicit indication of trigger frame start times in various embodiments. For example, logic flow 600 may be representative of operations that may be performed in some embodiments by one or more of STAs 104, 106, and 108 of FIGS. 1-5. In logic flow 600, a beacon frame may be received at 602 that comprises a start time for an applicable TWT interval. For example, STA 104 may receive a beacon frame from AP 102 that comprises a start time for an assigned TWT interval for TWT group 201. At 604, a transition from a sleep state to an awake state may be performed at or before the start time for the TWT interval. For example, at or before the start time for an assigned TWT interval for its TWT group 201, STA 104 may transition from a sleep state to an awake state.

At 606, a trigger frame may be received from an AP during the TWT interval. For example, STA 104 may receive a trigger frame from AP 102 during the TWT interval for its TWT group 201. From 606, flow may pass to 608, from which flow may then proceed in a manner depending on whether the trigger frame received at 606 comprises a TF-R. If the trigger frame received at 606 comprises a TF-R, flow may proceed from 608 to 610, where contention for channel access may be performed during the TWT interval. For example, in response to a determination that a trigger frame received from AP 102 is a TF-R, STA 104 may contend for channel access during the TWT interval for its TWT group 201. If the trigger frame received at 606 does not comprise a TF-R, flow may proceed from 608 to 612, where contention for channel access may not be performed during the TWT interval. For example, in response to a determination that a trigger frame received from AP 102 is not a TF-R, STA 104 may not contend for channel access during the TWT interval for its TWT group 201. The embodiments are not limited to these examples.

Figure 7:
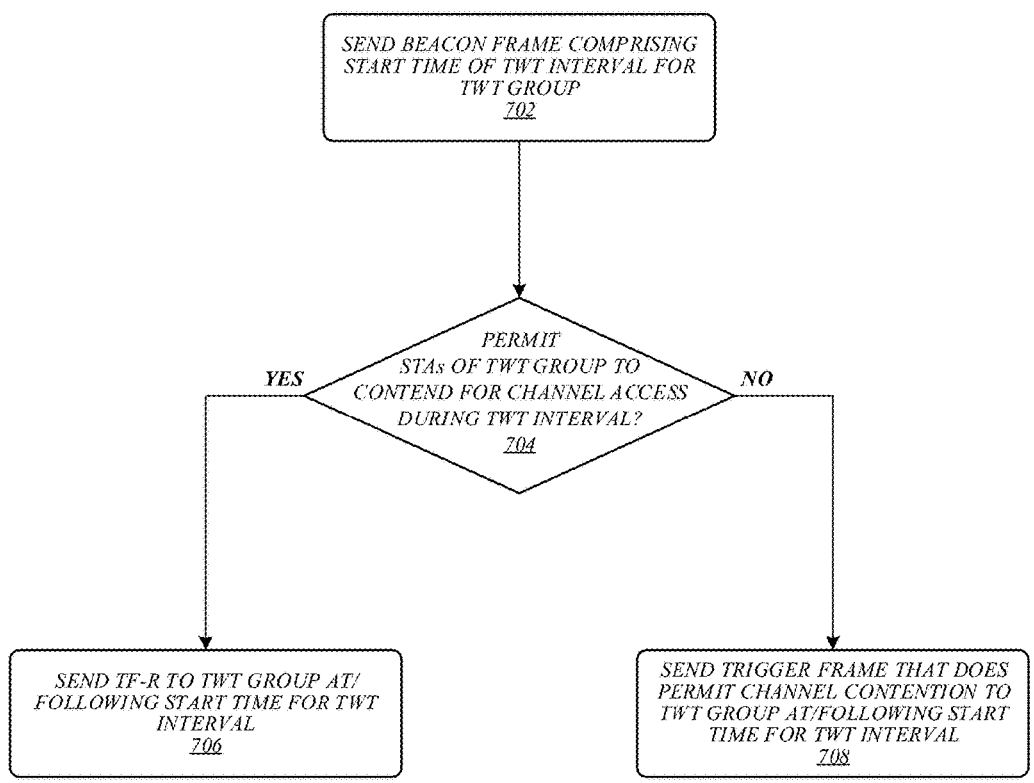
FIG. 7 illustrates an embodiment of a second logic flow.

FIG. 7 illustrates an embodiment of a logic flow 700, which may be representative of the implementation of techniques for implicit indication of trigger frame start times in various embodiments. For example, logic flow 700 may be representative of operations that may be performed in some embodiments by AP 102 of FIGS. 1-5. In logic flow 700, a beacon frame may be sent at 702 that comprises a start time for a TWT interval for a TWT group. For example, AP 102 may send a beacon frame that comprises a start time for a TWT interval for TWT group 201.

At 704, it may be determined whether STAs of the TWT group are to be permitted to contend for channel access during the TWT interval. If it is determined at 704 that such channel contention is to be permitted during the TWT interval, flow may proceed to 706, where a TF-R may be sent to the TWT group at or following the start time for the TWT interval. For example, in response to a determination to permit STAs of TWT group 201 to contend for channel access during the TWT interval for TWT group 201, AP 102 may send a TF-R to TWT group 201 at or following the start time for the TWT interval for TWT group 201. If it is determined at 704 that such channel contention is not to be permitted during the TWT interval, flow may proceed to 708, where a trigger frame that does not permit channel contention may be sent to the TWT group at or following the start time for the TWT interval. For example, in response to a determination not to permit STAs of TWT group 201 to contend for channel access during the TWT interval for TWT group 201, AP 102 may send a trigger frame that does not permit channel contention to TWT group 201 at or following the start time for the TWT interval for TWT group 201. The embodiments are not limited to these examples.

Figure 8:
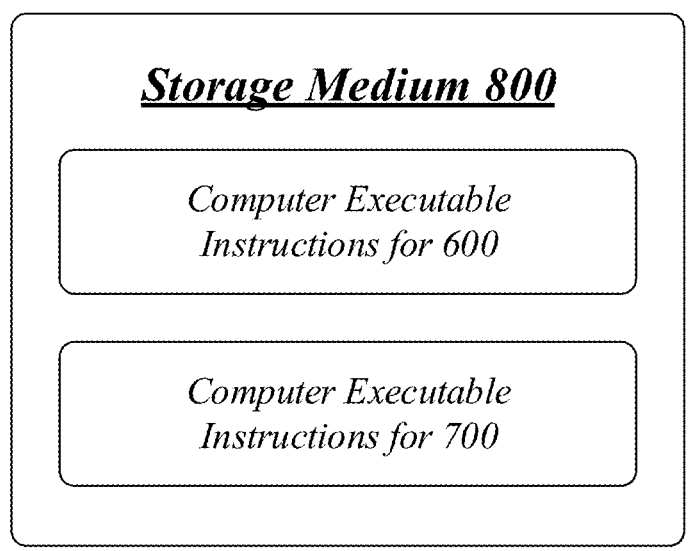
FIG. 8 illustrates an embodiment of a storage medium.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to enable a computing device to perform one or both of logic flow 600 of FIG. 6 and logic flow 700 of FIG. 7. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 9:
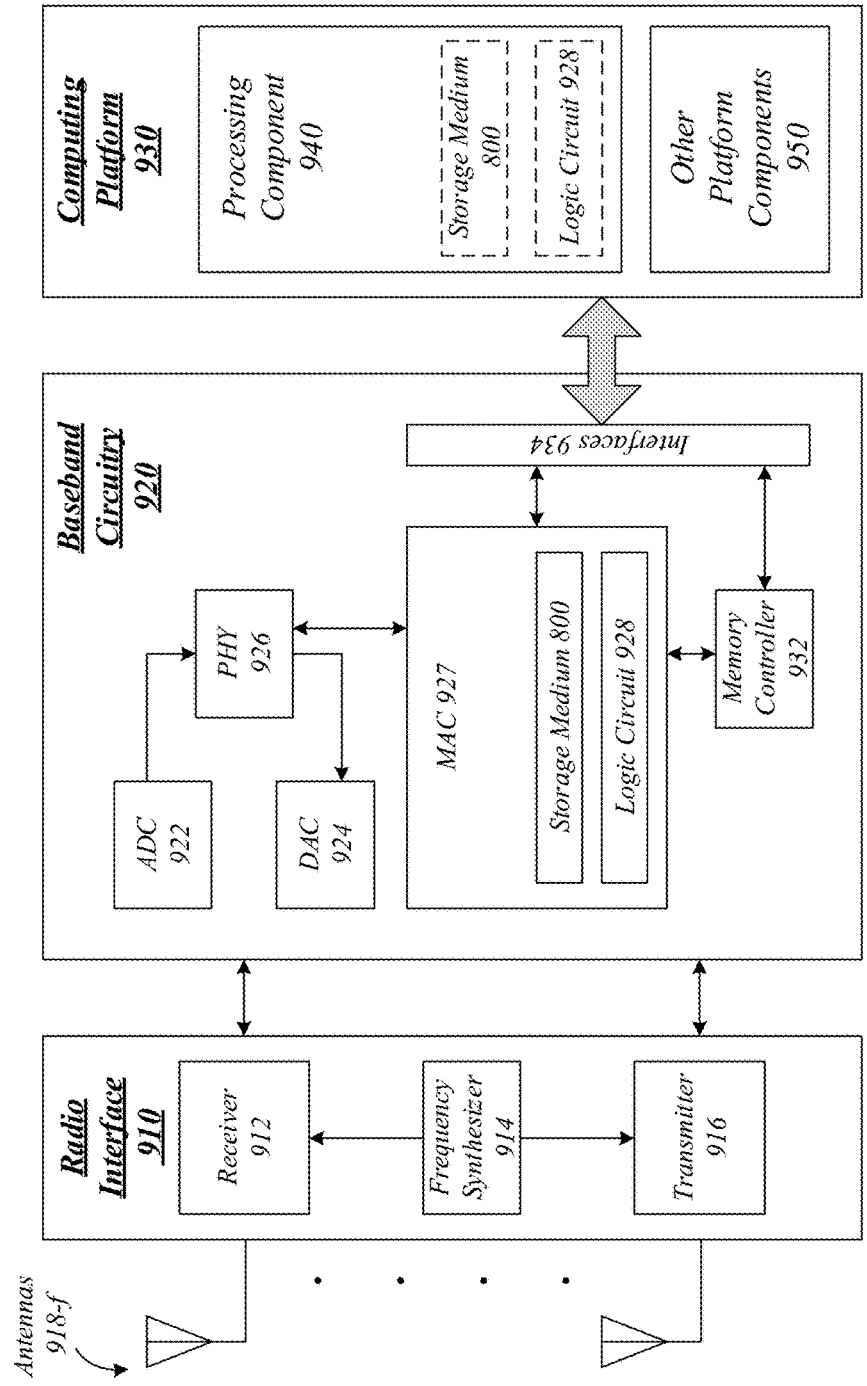
FIG. 9 illustrates an embodiment of a device.

FIG. 9 illustrates an embodiment of a communications device 900 that may implement one or more of AP 102, STAs 104, 106, 108, 110, 112, and 114, logic flow 600 of FIG. 6, logic flow 700 of FIG. 7, and storage medium 800 of FIG. 8. In various embodiments, device 900 may comprise a logic circuit 928. The logic circuit 928 may include physical circuits to perform operations described for one or more of AP 102, STAs 104, 106, 108, 110, 112, and 114, logic flow 600 of FIG. 6, and logic flow 700 of FIG. 7, for example. As shown in FIG. 9, device 900 may include a radio interface 910, baseband circuitry 920, and computing platform 930, although the embodiments are not limited to this configuration.

The device 900 may implement some or all of the structure and/or operations for one or more of AP 102, STAs 104, 106, 108, 110, 112, and 114, logic flow 600 of FIG. 6, logic flow 700 of FIG. 7, storage medium 800, and logic circuit 928 in a single computing entity, such as entirely within a single device. Alternatively, the device 900 may distribute portions of the structure and/or operations for one or more of AP 102, STAs 104, 106, 108, 110, 112, and 114, logic flow 600 of FIG. 6, logic flow 700 of FIG. 7, storage medium 800, and logic circuit 928 across multiple computing entities using a distributed system architecture, such as a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 910 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 910 may include, for example, a receiver 912, a frequency synthesizer 914, and/or a transmitter 916. Radio interface 910 may include bias controls, a crystal oscillator and/or one or more antennas 918-*f*. In another embodiment, radio interface 910 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 920 may communicate with radio interface 910 to process receive and/or transmit signals and may include, for example, an analog-to-digital converter 922 for down converting received signals, a digital-to-analog converter 924 for up converting signals for transmission. Further, baseband circuitry 920 may include a baseband or physical layer (PHY) processing circuit 926 for PHY link layer processing of respective receive/transmit signals. Baseband circuitry 920 may include, for example, a medium access control (MAC) processing circuit 927 for MAC/data link layer processing. Baseband circuitry 920 may include a memory controller 932 for communicating with MAC processing circuit 927 and/or a computing platform 930, for example, via one or more interfaces 934.

In some embodiments, PHY processing circuit 926 may include a frame construction and/or detection module, in combination with additional circuitry such as a buffer memory, to construct and/or deconstruct communication frames. Alternatively or in addition, MAC processing circuit 927 may share processing for certain of these functions or perform these processes independent of PHY processing circuit 926. In some embodiments, MAC and PHY processing may be integrated into a single circuit.

The computing platform 930 may provide computing functionality for the device 900. As shown, the computing platform 930 may include a processing component 940. In addition to, or alternatively of, the baseband circuitry 920, the device 900 may execute processing operations or logic for one or more of AP 102, STAs 104, 106, 108, 110, 112, and 114, logic flow 600 of FIG. 6, logic flow 700 of FIG. 7, storage medium 800, and logic circuit 928 using the processing component 940. The processing component 940 (and/or PHY 926 and/or MAC 927) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 930 may further include other platform components 950. Other platform components 950 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 900 described herein, may be included or omitted in various embodiments of device 900, as suitably desired.

Embodiments of device 900 may be implemented using single input single output (SISO) architectures. However, certain implementations may include multiple antennas (e.g., antennas 918-f) for transmission and/or reception using adaptive antenna techniques for beamforming or spatial division multiple access (SDMA) and/or using MIMO communication techniques.

The components and features of device 900 may be implemented using any combination of discrete circuitry, application specific integrated circuits (ASICs), logic gates and/or single chip architectures. Further, the features of device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 10:
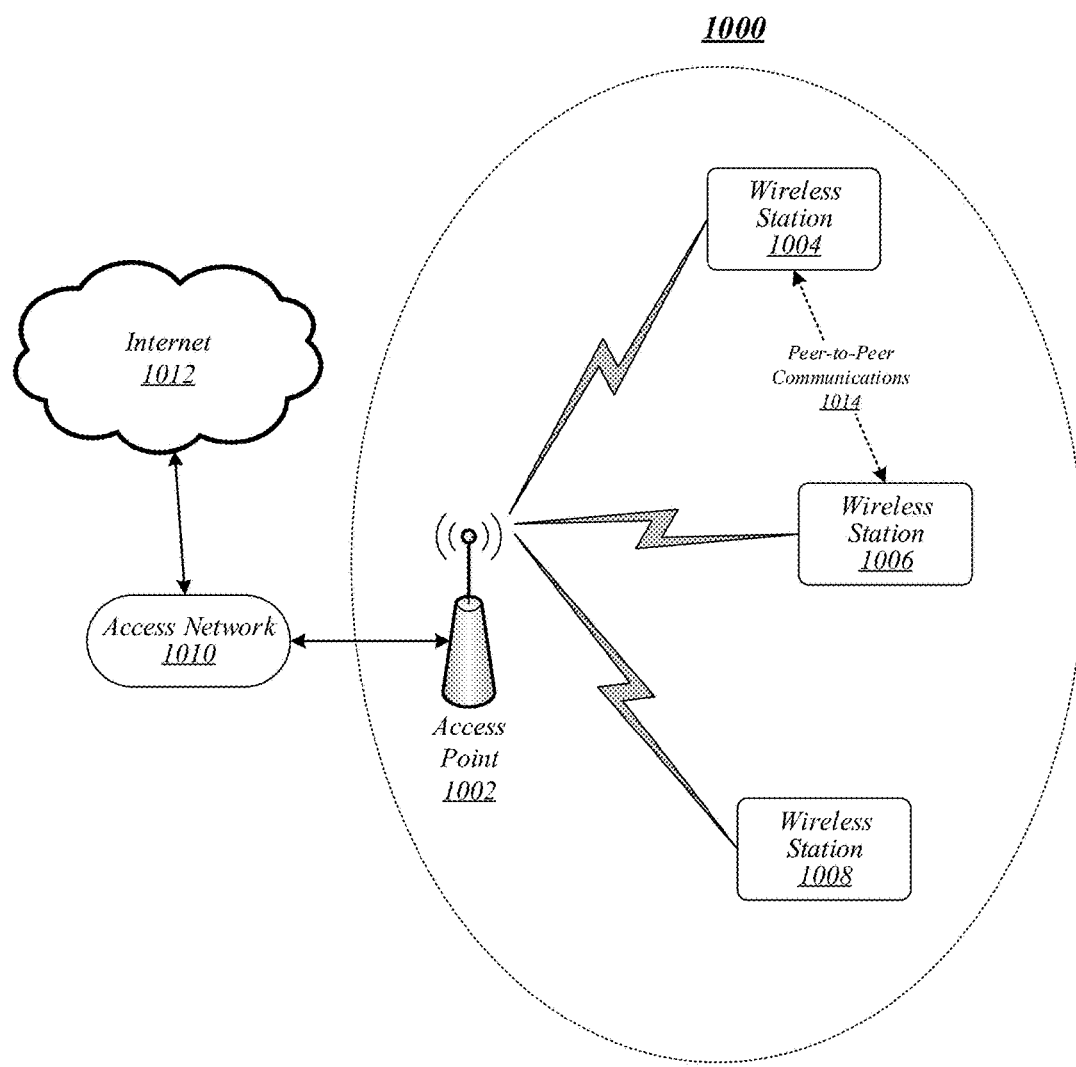
FIG. 10 illustrates an embodiment of a wireless network.

FIG. 10 illustrates an embodiment of a wireless network 1000. As shown in FIG. 10, wireless network comprises an access point 1002 and wireless stations 1004, 1006, and 1008. In various embodiments, wireless network 1000 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1000 may comprise another type of wireless network, and/or may implement other wireless communications standards. In various embodiments, for example, wireless network 1000 may comprise a WWAN or WPAN rather than a WLAN. The embodiments are not limited to this example.

In some embodiments, wireless network 1000 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1004, 1006, and 1008 may communicate with access point 1002 in order to obtain connectivity to one or more external data networks. In some embodiments, for example, wireless stations 1004, 1006, and 1008 may connect to the Internet 1012 via access point 1002 and access network 1010. In various embodiments, access network 1010 may comprise a private network that provides subscription-based Internet-connectivity, such as an Internet Service Provider (ISP) network. The embodiments are not limited to this example.

In various embodiments, two or more of wireless stations 1004, 1006, and 1008 may communicate with each other directly by exchanging peer-to-peer communications. For example, in the example of FIG. 10, wireless stations 1004 and 1006 communicate with each other directly by exchanging peer-to-peer communications 1014. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a wireless communication apparatus, comprising at least one memory and logic, at least a portion of which is in hardware, the logic to receive a beacon frame comprising a start time for a target wake time (TWT) interval assigned to a station (STA), transition the STA from a sleep state into an awake state at or before the start time for the TWT interval, and defer contending for access to a wireless channel during the TWT interval until a receipt of a trigger frame from an access point (AP).

In Example 2, the logic of Example 1 may optionally determine to contend for access to the wireless channel during the TWT interval in response to a determination that the trigger frame comprises a random access trigger frame (TF-R).

In Example 3, the logic of Example 2 may optionally send an uplink (UL) short frame in order to contend for access to the wireless channel during the TWT interval.

In Example 4, the logic of any of Examples 2 to 3 may optionally send a power saving poll (PS-Poll) frame in order to contend for access to the wireless channel during the TWT interval.

In Example 5, the logic of Example 4 may optionally receive a second trigger frame in response to the PS-Poll frame, the second trigger frame to identify assigned resources for an uplink (UL) transmission of the STA during the TWT interval.

In Example 6, the logic of any of Examples 1 to 5 may optionally determine not to contend for access to the wireless channel during the TWT interval in response to a determination that the trigger frame does not comprise a random access trigger frame (TF-R).

In Example 7, the logic of any of Examples 1 to 6 may optionally transition the STA into the sleep state following receipt of the beacon frame.

In Example 8, the logic of Example 7 may optionally transition the STA from the sleep state into the awake state at or before the start time for the TWT interval.

In Example 9, the STA of any of Examples 1 to 8 may optionally be comprised among a plurality of STAs of a TWT group, the TWT interval to constitute a TWT interval for the TWT group.

In Example 10, the beacon frame of Example 9 may optionally comprise an identifier for the TWT group.

Example 11 is a system, comprising a wireless communication apparatus according to any of Examples 1 to 10 and at least one processor.

In Example 12, the system of Example 11 may optionally comprise at least one radio frequency (RF) transceiver.

In Example 13, the system of any of Examples 11 to 12 may optionally comprise at least one RF antenna.

Example 14 is a wireless communication apparatus, comprising at least one memory and logic, at least a portion of which is in hardware, the logic to send a beacon frame comprising a start time for a target wake time (TWT) interval for a TWT group comprising a plurality of stations (STAs), determine whether to permit STAs of the TWT group to contend for access to a wireless channel during the TWT interval, and in response to a determination to permit STAs of the TWT group to content for access to the wireless channel during the TWT interval, send a random access trigger frame (TF-R) to the TWT group at or following the start time for the TWT interval.

In Example 15, the logic of Example 14 may optionally receive a power-saving poll (PS-Poll) frame from a STA of the TWT group in response to the TF-R.

In Example 16, the logic of Example 15 may optionally schedule resources for an uplink (UL) transmission of the STA during the TWT interval in response to receipt of the PS-Poll frame.

In Example 17, the logic of Example 16 may optionally send a second trigger frame in order to notify the STA of the scheduled resources.

In Example 18, the logic of any of Examples 14 to 17 may optionally send a trigger frame that does not permit channel contention in response to a determination not to permit STAs of the TWT group to contend for access to the wireless channel during the TWT interval.

In Example 19, the trigger frame of Example 18 may optionally identify assigned resources for a STA comprised among the TWT group.

In Example 20, the logic of Example 19 may optionally send buffered data to the STA during the TWT interval using the assigned resources.

In Example 21, the logic of any of Examples 14 to 20 may optionally schedule a contention period outside of the TWT interval for one or more STAs that do not use TWTs.

In Example 22, the beacon frame of Example 21 may optionally comprise a TF-R start time indicating a start time of the contention period scheduled outside of the TWT interval.

In Example 23, the logic of any of Examples 14 to 22 may optionally send a series of TF-Rs during the TWT interval, each TF-R of the series to comprise a cascade indication bit to indicate whether it is to be followed by another TF-R.

In Example 24, the logic of Example 23 may optionally set a cascade bit of a last TF-R of the series to a value indicating that the last TF-R is not followed by another TF-R.

Example 25 is a system, comprising a wireless communication apparatus according to any of Examples 14 to 24 and at least one processor.

In Example 26, the system of Example 25 may optionally comprise at least one radio frequency (RF) transceiver.

In Example 27, the system of any of Examples 25 to 26 may optionally comprise at least one RF antenna.

Example 28 is at least one non-transitory computer-readable storage medium comprising a set of wireless communication instructions that, in response to being executed at a station (STA), cause the STA to receive a beacon frame comprising a start time for a target wake time (TWT) interval assigned to the STA, transition from a sleep state to an awake state at or before the start time for the TWT interval, and defer contending for access to a wireless channel during the TWT interval until a receipt of a trigger frame from an access point (AP).

In Example 29, the at least one non-transitory computer-readable storage medium of Example 28 may optionally comprise wireless communication instructions that, in response to being executed at the STA, cause the STA to determine to contend for access to the wireless channel during the TWT interval in response to a determination that the trigger frame comprises a random access trigger frame (TF-R).

In Example 30, the at least one non-transitory computer-readable storage medium of Example 29 may optionally comprise wireless communication instructions that, in response to being executed at the STA, cause the STA to send an uplink (UL) short frame in order to contend for access to the wireless channel during the TWT interval.

In Example 31, the at least one non-transitory computer-readable storage medium of any of Examples 29 to 30 may optionally comprise wireless communication instructions that, in response to being executed at the STA, cause the STA to send a power saving poll (PS-Poll) frame in order to contend for access to the wireless channel during the TWT interval.

In Example 32, the at least one non-transitory computer-readable storage medium of Example 31 may optionally comprise wireless communication instructions that, in response to being executed at the STA, cause the STA to receive a second trigger frame in response to the PS-Poll frame, the second trigger frame to identify assigned resources for an uplink (UL) transmission of the STA during the TWT interval.

In Example 33, the at least one non-transitory computer-readable storage medium of any of Examples 28 to 32 may optionally comprise wireless communication instructions that, in response to being executed at the STA, cause the STA to determine not to contend for access to the wireless channel during the TWT interval in response to a determination that the trigger frame does not comprise a random access trigger frame (TF-R).

In Example 34, the at least one non-transitory computer-readable storage medium of any of Examples 28 to 33 may optionally comprise wireless communication instructions that, in response to being executed at the STA, cause the STA to transition into the sleep state following receipt of the beacon frame.

In Example 35, the at least one non-transitory computer-readable storage medium of Example 34 may optionally comprise wireless communication instructions that, in response to being executed at the STA, cause the STA to transition from the sleep state into the awake state at or before the start time for the TWT interval.

In Example 36, the STA of any of Examples 28 to 35 may optionally be comprised among a plurality of STAs of a TWT group, the TWT interval to constitute a TWT interval for the TWT group.

In Example 37, the beacon frame of Example 36 may optionally comprise an identifier for the TWT group.

Example 38 is at least one non-transitory computer-readable storage medium comprising a set of wireless communication instructions that, in response to being executed at an access point (AP), cause the AP to send a beacon frame comprising a start time for a target wake time (TWT) interval for a TWT group comprising a plurality of stations (STAs), determine whether to permit STAs of the TWT group to contend for access to a wireless channel during the TWT interval, and in response to a determination to permit STAs of the TWT group to content for access to the wireless channel during the TWT interval, send a random access trigger frame (TF-R) to the TWT group at or following the start time for the TWT interval.

In Example 39, the at least one non-transitory computer-readable storage medium of Example 38 may optionally comprise wireless communication instructions that, in response to being executed at the AP, cause the AP to receive a power-saving poll (PS-Poll) frame from a STA of the TWT group in response to the TF-R.

In Example 40, the at least one non-transitory computer-readable storage medium of Example 39 may optionally comprise wireless communication instructions that, in response to being executed at the AP, cause the AP to schedule resources for an uplink (UL) transmission of the STA during the TWT interval in response to receipt of the PS-Poll frame.

In Example 41, the at least one non-transitory computer-readable storage medium of Example 40 may optionally comprise wireless communication instructions that, in response to being executed at the AP, cause the AP to send a second trigger frame in order to notify the STA of the scheduled resources.

In Example 42, the at least one non-transitory computer-readable storage medium of any of Examples 38 to 41 may optionally comprise wireless communication instructions that, in response to being executed at the AP, cause the AP to send a trigger frame that does not permit channel contention in response to a determination not to permit STAs of the TWT group to contend for access to the wireless channel during the TWT interval.

In Example 43, the trigger frame of Example 42 may optionally identify assigned resources for a STA comprised among the TWT group.

In Example 44, the at least one non-transitory computer-readable storage medium of Example 43 may optionally comprise wireless communication instructions that, in response to being executed at the AP, cause the AP to send buffered data to the STA during the TWT interval using the assigned resources.

In Example 45, the at least one non-transitory computer-readable storage medium of any of Examples 38 to 44 may optionally comprise wireless communication instructions that, in response to being executed at the AP, cause the AP to schedule a contention period outside of the TWT interval for one or more STAs that do not use TWTs.

In Example 46, the beacon frame of Example 45 may optionally comprise a TF-R start time indicating a start time of the contention period scheduled outside of the TWT interval.

In Example 47, the at least one non-transitory computer-readable storage medium of any of Examples 38 to 46 may optionally comprise wireless communication instructions that, in response to being executed at the AP, cause the AP to send a series of TF-Rs during the TWT interval, each TF-R of the series to comprise a cascade indication bit to indicate whether it is to be followed by another TF-R.

In Example 48, the at least one non-transitory computer-readable storage medium of Example 47 may optionally comprise wireless communication instructions that, in response to being executed at the AP, cause the AP to set a cascade bit of a last TF-R of the series to a value indicating that the last TF-R is not followed by another TF-R.

Example 49 is a wireless communication method, comprising receiving, at a station (STA), a beacon frame comprising a start time for a target wake time (TWT) interval assigned to the STA, transitioning the STA from a sleep state to an awake state at or before the start time for the TWT interval, and deferring contending for access to a wireless channel during the TWT interval until a receipt of a trigger frame from an access point (AP).

In Example 50, the wireless communication method of Example 49 may optionally comprise determining to contend for access to the wireless channel during the TWT interval in response to a determination that the trigger frame comprises a random access trigger frame (TF-R).

In Example 51, the wireless communication method of Example 50 may optionally comprise sending an uplink (UL) short frame in order to contend for access to the wireless channel during the TWT interval.

In Example 5, the wireless communication method of any of Examples 50 to 51 may optionally comprise sending a power saving poll (PS-Poll) frame in order to contend for access to the wireless channel during the TWT interval.

In Example 53, the wireless communication method of Example 52 may optionally comprise receiving a second trigger frame in response to the PS-Poll frame, the second trigger frame to identify assigned resources for an uplink (UL) transmission of the STA during the TWT interval.

In Example 54, the wireless communication method of any of Examples 49 to 53 may optionally comprise determining not to contend for access to the wireless channel during the TWT interval in response to a determination that the trigger frame does not comprise a random access trigger frame (TF-R).

In Example 55, the wireless communication method of any of Examples 49 to 54 may optionally comprise transitioning into the sleep state following receipt of the beacon frame.

In Example 56, the wireless communication method of Example 55 may optionally comprise transitioning from the sleep state into the awake state at or before the start time for the TWT interval.

In Example 57, the STA of any of Examples 49 to 56 may optionally be comprised among a plurality of STAs of a TWT group, the TWT interval to constitute a TWT interval for the TWT group.

In Example 58, the beacon frame of Example 57 may optionally comprise an identifier for the TWT group.

Example 59 is at least one non-transitory computer-readable storage medium comprising a set of instructions that, in response to being executed on a computing device, cause the computing device to perform a wireless communication method according to any of Examples 49 to 58.

Example 60 is an apparatus, comprising means for performing a wireless communication method according to any of Examples 49 to 58.

Example 61 is a system, comprising the apparatus of Example 60, at least one memory, and at least one processor.

In Example 62, the system of Example 61 may optionally comprise at least one radio frequency (RF) transceiver.

In Example 63, the system of any of Examples 61 to 62 may optionally comprise at least one RF antenna.

Example 64 is a wireless communication method, comprising sending, from an access point (AP), a beacon frame comprising a start time for a target wake time (TWT) interval for a TWT group comprising a plurality of stations (STAs), determining, by processing circuitry of the AP, whether to permit STAs of the TWT group to contend for access to a wireless channel during the TWT interval, and sending a random access trigger frame (TF-R) to the TWT group at or following the start time for the TWT interval in response to a determination to permit STAs of the TWT group to content for access to the wireless channel during the TWT interval.

In Example 65, the wireless communication method of Example 64 may optionally comprise receiving a power-saving poll (PS-Poll) frame from a STA of the TWT group in response to the TF-R.

In Example 66, the wireless communication method of Example 65 may optionally comprise scheduling resources for an uplink (UL) transmission of the STA during the TWT interval in response to receipt of the PS-Poll frame.

In Example 67, the wireless communication method of Example 66 may optionally comprise sending a second trigger frame in order to notify the STA of the scheduled resources.

In Example 68, the wireless communication method of any of Examples 64 to 67 may optionally comprise sending a trigger frame that does not permit channel contention in response to a determination not to permit STAs of the TWT group to contend for access to the wireless channel during the TWT interval.

In Example 69, the trigger frame of Example 68 may optionally identify assigned resources for a STA comprised among the TWT group.

In Example 70, the wireless communication method of Example 69 may optionally comprise sending buffered data to the STA during the TWT interval using the assigned resources.

In Example 71, the wireless communication method of any of Examples 64 to 70 may optionally comprise scheduling a contention period outside of the TWT interval for one or more STAs that do not use TWTs.

In Example 72, the beacon frame of Example 71 may optionally comprise a TF-R start time indicating a start time of the contention period scheduled outside of the TWT interval.

In Example 73, the wireless communication method of any of Examples 64 to 72 may optionally comprise sending a series of TF-Rs during the TWT interval, each TF-R of the series to comprise a cascade indication bit to indicate whether it is to be followed by another TF-R.

In Example 74, the wireless communication method of Example 73 may optionally comprise setting a cascade bit of a last TF-R of the series to a value indicating that the last TF-R is not followed by another TF-R.

Example 75 is at least one non-transitory computer-readable storage medium comprising a set of instructions that, in response to being executed on a computing device, cause the computing device to perform a wireless communication method according to any of Examples 64 to 74.

Example 76 is an apparatus, comprising means for performing a wireless communication method according to any of Examples 64 to 74.

Example 77 is a system, comprising the apparatus of Example 76, at least one memory, and at least one processor.

In Example 78, the system of Example 77 may optionally comprise at least one radio frequency (RF) transceiver.

In Example 79, the system of any of Examples 77 to 78 may optionally comprise at least one RF antenna.

Example 80 is a wireless communication apparatus, comprising means for receiving, at a station (STA), a beacon frame comprising a start time for a target wake time (TWT) interval assigned to the STA, means for transitioning the STA from a sleep state to an awake state at or before the start time for the TWT interval, and means for deferring contending for access to a wireless channel during the TWT interval until a receipt of a trigger frame from an access point (AP).

In Example 81, the wireless communication apparatus of Example 80 may optionally comprise means for determining to contend for access to the wireless channel during the TWT interval in response to a determination that the trigger frame comprises a random access trigger frame (TF-R).

In Example 82, the wireless communication apparatus of Example 81 may optionally comprise means for sending an uplink (UL) short frame in order to contend for access to the wireless channel during the TWT interval.

In Example 83, the wireless communication apparatus of any of Examples 81 to 82 may optionally comprise means for sending a power saving poll (PS-Poll) frame in order to contend for access to the wireless channel during the TWT interval.

In Example 84, the wireless communication apparatus of Example 83 may optionally comprise means for receiving a second trigger frame in response to the PS-Poll frame, the second trigger frame to identify assigned resources for an uplink (UL) transmission of the STA during the TWT interval.

In Example 85, the wireless communication apparatus of any of Examples 80 to 84 may optionally comprise means for determining not to contend for access to the wireless channel during the TWT interval in response to a determination that the trigger frame does not comprise a random access trigger frame (TF-R).

In Example 86, the wireless communication apparatus of any of Examples 80 to 85 may optionally comprise means for transitioning into the sleep state following receipt of the beacon frame.

In Example 87, the wireless communication apparatus of Example 86 may optionally comprise means for transitioning from the sleep state into the awake state at or before the start time for the TWT interval.

In Example 88, the STA of any of Examples 80 to 87 may optionally be comprised among a plurality of STAs of a TWT group, the TWT interval to constitute a TWT interval for the TWT group.

In Example 89, the beacon frame of Example 88 may optionally comprise an identifier for the TWT group.

Example 90 is a system, comprising a wireless communication apparatus according to any of Examples 80 to 89, at least one memory, and at least one processor.

In Example 91, the system of Example 90 may optionally comprise at least one radio frequency (RF) transceiver.

In Example 92, the system of any of Examples 90 to 91 may optionally comprise at least one RF antenna.

Example 93 is a wireless communication apparatus, comprising means for sending, from an access point (AP), a beacon frame comprising a start time for a target wake time (TWT) interval for a TWT group comprising a plurality of stations (STAs), means for determining whether to permit STAs of the TWT group to contend for access to a wireless channel during the TWT interval, and means for sending a random access trigger frame (TF-R) to the TWT group at or following the start time for the TWT interval in response to a determination to permit STAs of the TWT group to content for access to the wireless channel during the TWT interval.

In Example 94, the wireless communication apparatus of Example 93 may optionally comprise means for receiving a power-saving poll (PS-Poll) frame from a STA of the TWT group in response to the TF-R.

In Example 95, the wireless communication apparatus of Example 94 may optionally comprise means for scheduling resources for an uplink (UL) transmission of the STA during the TWT interval in response to receipt of the PS-Poll frame.

In Example 96, the wireless communication apparatus of Example 95 may optionally comprise means for sending a second trigger frame in order to notify the STA of the scheduled resources.

In Example 97, the wireless communication apparatus of any of Examples 93 to 96 may optionally comprise means for sending a trigger frame that does not permit channel contention in response to a determination not to permit STAs of the TWT group to contend for access to the wireless channel during the TWT interval.

In Example 98, the trigger frame of Example 97 may optionally identify assigned resources for a STA comprised among the TWT group.

In Example 99, the wireless communication apparatus of Example 98 may optionally comprise means for sending buffered data to the STA during the TWT interval using the assigned resources.

In Example 100, the wireless communication apparatus of any of Examples 93 to 99 may optionally comprise means for scheduling a contention period outside of the TWT interval for one or more STAs that do not use TWTs.

In Example 101, the beacon frame of Example 100 may optionally comprise a TF-R start time indicating a start time of the contention period scheduled outside of the TWT interval.

In Example 102, the wireless communication apparatus of any of Examples 93 to 101 may optionally comprise means for sending a series of TF-Rs during the TWT interval, each TF-R of the series to comprise a cascade indication bit to indicate whether it is to be followed by another TF-R.

In Example 103, the wireless communication apparatus of Example 102 may optionally comprise means for setting a cascade bit of a last TF-R of the series to a value indicating that the last TF-R is not followed by another TF-R.

Example 104 is a system, comprising a wireless communication apparatus according to any of Examples 93 to 103, at least one memory, and at least one processor.

In Example 105, the system of Example 104 may optionally comprise at least one radio frequency (RF) transceiver.

In Example 106, the system of Example 105 may optionally comprise at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic, at least a portion of which is in hardware, the logic to:
      receive a beacon frame comprising a start time for a target wake time (TWT) interval assigned to a station (STA),
      transition the STA from a sleep state into an awake state at or before the start time for the TWT interval,
      defer contending for access to a wireless channel during the TWT interval until a receipt of a trigger frame or a random access trigger frame (TF-R) from an access point (AP),
      receive one of the trigger frame or the TF-R from the AP,
      determine to contend for access to the wireless channel during the TWT interval in response to a determination that the TF-R is received from the AP, and
      determine not to contend for access to the wireless channel during the TWT interval in response to a determination that the trigger frame is received from the AP.

2. The apparatus of claim 1, the logic to send a power saving poll (PS-Poll) frame in order to contend for access to the wireless channel during the TWT interval.

3. The apparatus of claim 2, the logic to receive a second trigger frame in response to the PS-Poll frame, the second trigger frame to identify assigned resources for an uplink (UL) transmission of the STA during the TWT interval.

4. The apparatus of claim 1, the STA to be comprised among a plurality of STAs of a TWT group, the TWT interval to constitute a TWT interval for the TWT group.

5. The apparatus of claim 1, comprising:
   at least one radio frequency (RF) transceiver; and
   at least one processor.

6. An apparatus, comprising:
   at least one memory; and
   logic, at least a portion of which is in hardware, the logic to:
      send a beacon frame comprising a start time for a target wake time (TWT) interval for a TWT group comprising a plurality of stations (STAs),
      determine whether to permit STAs of the TWT group to contend for access to a wireless channel during the TWT interval,
      in response to a determination to permit STAs of the TWT group to contend for access to the wireless channel during the TWT interval, send a random access trigger frame (TF-R) to the TWT group at or following the start time for the TWT interval, and
      in response to a determination to not permit STAs of the TWT group to contend for access to the wireless channel during the TWT interval, send a trigger frame to the TWT group at or following the start time for the TWT interval.

7. The apparatus of claim 6, the logic to receive a power-saving poll (PS-Poll) frame from a STA of the TWT group in response to the TF-R.

8. The apparatus of claim 7, the logic to schedule resources for an uplink (UL) transmission of the STA during the TWT interval in response to receipt of the PS-Poll frame.

9. The apparatus of claim 8, the logic to send a second trigger frame in order to notify the STA of the scheduled resources.

10. The apparatus of claim 6, the logic to schedule a contention period outside of the TWT interval for one or more STAs that do not use TWTs, the beacon frame to comprise a TF-R start time indicating a start time of the contention period scheduled outside of the TWT interval.

11. At least one non-transitory computer-readable storage medium comprising a set of instructions that, in response to being executed at a station (STA), cause the STA to:
    receive a beacon frame comprising a start time for a target wake time (TWT) interval assigned to the STA;
    transition from a sleep state to an awake state at or before the start time for the TWT interval;
    defer contending for access to a wireless channel during the TWT interval until a receipt of a trigger frame or a random access trigger frame (TF-R) from an access point (AP);
    receive one of the trigger frame or the TF-R from the AP;
    determine to contend for access to the wireless channel during the TWT interval in response to a determination that the TF-R is received from the AP; and
    determine not to contend for access to the wireless channel during the TWT interval in response to a determination that the trigger frame is received from the AP.

12. The at least one non-transitory computer-readable storage medium of claim 11, comprising instructions that, in response to being executed at the STA, cause the STA to send a power saving poll (PS-Poll) frame in order to contend for access to the wireless channel during the TWT interval.

13. The at least one non-transitory computer-readable storage medium of claim 12, comprising instructions that, in response to being executed at the STA, cause the STA to receive a second trigger frame in response to the PS-Poll frame, the second trigger frame to identify assigned resources for an uplink (UL) transmission of the STA during the TWT interval.

14. The at least one non-transitory computer-readable storage medium of claim 11, the STA to be comprised among a plurality of STAs of a TWT group, the TWT interval to constitute a TWT interval for the TWT group.

15. At least one non-transitory computer-readable storage medium comprising a set of instructions that, in response to being executed at an access point (AP), cause the AP to:
    send a beacon frame comprising a start time for a target wake time (TWT) interval for a TWT group comprising a plurality of stations (STAs);
    determine whether to permit STAs of the TWT group to contend for access to a wireless channel during the TWT interval;
    in response to a determination to permit STAs of the TWT group to content for access to the wireless channel during the TWT interval, send a random access trigger frame (TF-R) to the TWT group at or following the start time for the TWT interval; and
    in response to a determination to not permit STAs of the TWT group to contend for access to the wireless channel during the TWT interval, send a trigger frame to the TWT group at or following the start time for the TWT interval.

16. The at least one non-transitory computer-readable storage medium of claim 15, comprising instructions that, in response to being executed at the AP, cause the AP to receive a power-saving poll (PS-Poll) frame from a STA of the TWT group in response to the TF-R.

17. The at least one non-transitory computer-readable storage medium of claim 16, comprising instructions that, in response to being executed at the AP, cause the AP to schedule resources for an uplink (UL) transmission of the STA during the TWT interval in response to receipt of the PS-Poll frame.

18. The at least one non-transitory computer-readable storage medium of claim 17, comprising instructions that, in response to being executed at the AP, cause the AP to send a second trigger frame in order to notify the STA of the scheduled resources.

19. The at least one non-transitory computer-readable storage medium of claim 15, comprising instructions that, in response to being executed at the AP, cause the AP to schedule a contention period outside of the TWT interval for one or more STAs that do not use TWTs, the beacon frame to comprise a TF-R start time indicating a start time of the contention period scheduled outside of the TWT interval.

* * * * *